United States Patent [19]

Hamada et al.

[11] Patent Number: 4,527,679

[45] Date of Patent: Jul. 9, 1985

[54] ELECTRO-PNEUMATIC CLUTCH CONTROL VALVE

[75] Inventors: Tooru Hamada, Neyagawa; Hirohisa Tanaka, Tokyo; Tomoo Ishihara, Takaidonishi, all of Japan

[73] Assignee: Kabushiki Kaisha Daikin Seisakusho, Neyagawa, Japan

[21] Appl. No.: 409,977

[22] Filed: Aug. 20, 1982

[51] Int. Cl.³ .............................................. B60K 41/28
[52] U.S. Cl. ................................. 192/3.58; 192/0.052; 192/103 R
[58] Field of Search ................. 192/3.57, 0.052, 0.075, 192/0.076, 0.092, 3.59, 3.58, 103 R; 137/85, 625.65; 361/152

[56] References Cited

U.S. PATENT DOCUMENTS

| | | | |
|---|---|---|---|
| 2,763,347 | 9/1956 | Haubourdin et al. | 192/0.052 |
| 3,039,321 | 6/1962 | Weymann | 192/3.58 |
| 3,094,132 | 6/1963 | Byloff | 137/85 |
| 3,273,679 | 9/1966 | Uher | 192/0.052 |
| 3,379,291 | 4/1968 | Randol | 192/0.052 |
| 4,061,217 | 12/1977 | Toyota et al. | 192/0.076 |
| 4,091,902 | 5/1978 | Hamada | 192/0.076 |
| 4,281,751 | 8/1981 | Suga et al. | 192/3.59 |

*Primary Examiner*—George H. Krizmanich
*Attorney, Agent, or Firm*—Armstrong, Nikaido, Marmelstein & Kubovcik

[57] ABSTRACT

An automatic clutch unit having a pneumatically operated servo-cylinder for operating a clutch and simultaneously incorporating one newly-developed proportional electro-pneumatic control valve, which supplies an air quantity corresponding to an intensity of electric current, to have the clutch shift in compliance with a delicate clutch displacement pattern according to each driving condition; perceiving that vacuum can easily be extracted from an intake manifold in case of a vehicle powered by a petrol engine and that a compressor for braking operation is always equipped in case of a vehicle powered by a large diesel engine.

3 Claims, 4 Drawing Figures

| $\omega_V$ | $\omega_V < \omega_{VS}$ | | $\omega_V > \omega_{VS}$ | |
|---|---|---|---|---|
| U | $U \neq 0$ | $U = 0$ | Shifting $S=1 \rightarrow S=0$ | No shifting $S=0$ |
| Contents of control | Follow-up control of $Y$ through $\omega_E$ $Y = Y_0(\omega_E)$ | Disengagement $Y = 0$ | Disengaged quickly and engaged with cushion $Y=0$ (Diseng.) $Y=0 \rightarrow Y_M/2 \rightarrow Y_M$ (Eng.) | Always engaged $Y = Y_M$ |
| Pattern |  |  |  |  |

4,527,679

ELECTRO-PNEUMATIC CLUTCH CONTROL VALVE

FIELD OF THE INVENTION

This invention relates to an automatic clutch unit for use in an automobile equipped with an ordinary dry plate clutch: in which; rotational speed of power unit (engine), clutch displacement (thrusting amount), vehicle speed, and opening or closing of accelerator pedal etc. are electrically detected; the clutch displacement and the rotational speed of power unit are computed in accordance with the vehicle speed, the opening or closing of accelerator pedal, and whether a shift lever is operated or not (driving condition); compressed air pressure or vacuum is led to a pneumatic clutch operating servo-cylinder by means of a proportional electro-pneumatic control valve; and the clutch is smoothly engaged or disengaged in compliance with a previously prescribed pattern.

DESCRIPTION OF THE PRIOR ART

In the field of automobiles, various so-called two-pedal (semi-automatic) type clutch units, provided with only acceleration pedals & brake pedals and without clutch pedals, have been proposed. In a clutch unit where a clutch is operated by means of a hydraulic servo-cylinder, however, it is necessary to equip a special hydraulic pump on an engine, which will result not only in an increase in a manufacturing cost but in complicated mechanism of the unit because the unit is required to be provided with a special circuit which compensates a change in viscosity of working oil caused by a change in temperature. To cope with these disadvantages, the applicant of this invention developed a clutch unit in which the clutch was actuated by means of a pneumatically operated servo-cylinder. A conventional pneumatically operated control unit was actuated by means of on-off valves. However, its mechanism had disadvantages not only that it required numerous on-off valves to cause a complexity in design and an increase in the manufacturing cost but that fine and delicate control was impossible, because numerous on-off valves were to be provided in a pneumatic control line in order to control the clutch displacement suitable to the prescribed pattern according to driving conditions such as the vehicle speed, the opening or closing of the acceleration pedal, and whether the shift lever was operated or not.

SUMMARY OF THE INVENTION

This invention is concerned with an automatic clutch unit; in which a pneumatically operated servo-cylinder is adopted for operating a clutch and simultaneously one newly-developed proportional electro-pneumatic control valve, which supplies an air quantity corresponding to an intensity of electric current, is incorporated therein to have the clutch shift in compliance with delicate clutch displacement patterns according to each driving condition, perceiving that vacuum can easily be extracted from an intake manifold in case of a vehicle powered by a petrol engine and that a compressor for braking operation is always equipped in case of a vehicle powered by a large diesel engine. An object of this invention is to provide a clutch control unit which can make it possible to modify a conventional clutch unit into a semiautomatic clutch unit without working a great improvement in a conventional vehicle. Another object of the invention is to eliminate influences from a change in temperature to stabilize the performance of clutch. A further object of the invention is to make the delicate and fine control possible by use of one control valve in order to improve driving feeling and, at the same time, to reduce the manufacturing cost to a minimum.

In order to achieve the above objects, the clutch unit of this invention comprises a pneumatically operated servo-cylinder for operating the clutch, a pneumatic power supply, a proportional electro-pneumatic control valve which is arranged in between the above two equipments and supplies an air quantity corresponding to an intensity of electric current, and an electronic control box which controls the above intensity of electric current so that the clutch can actuate in accordance with the patterns previously prescribed on every driving condition.

DETAILED DESCRIPTION OF THE INVENTION

Figure 1:
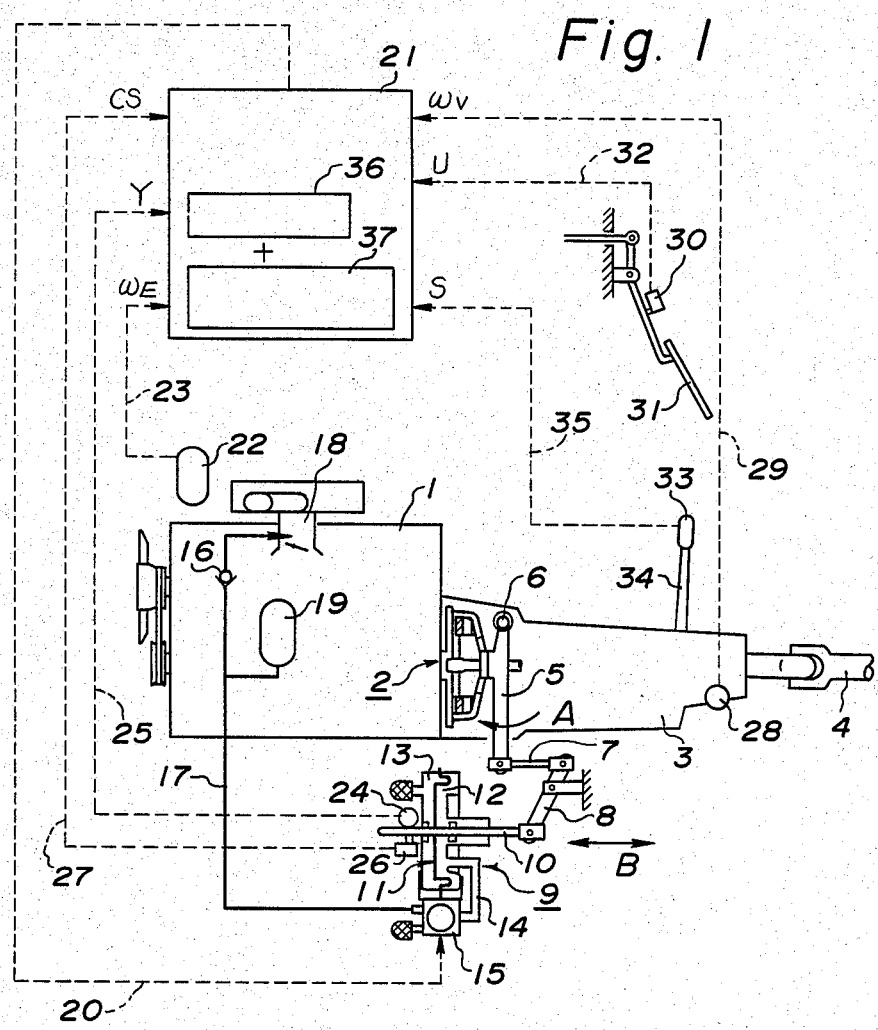
FIG. 1 is a diagramatic structural drawing including a part of left side view of a clutch unit in accordance with the present invention.

In FIG. 1, an engine 1 is connected to a differential mechanism (not shown in the figure) for driving rear wheels through a clutch 2, a transmission 3, and a propeller shaft 4. The clutch 2 is normally situated at the engaged (contacting) condition as shown in the figure, being disengaged (cut off) when a release lever 5 is turned about a fulcrum point 6 in the direction of the arrow A. The release lever 5 is connected to a rod 10 of a servo-cylinder 9 through a rod 7 and an arm 8, a diaphragm 11 is fixed to the rod 10, and the diaphragm 11 partitions the servo-cylinder 9 into a vacuum chamber 12 and an atmospheric chamber 13.

The vacuum chamber 12 is connected to an outlet of a proportional electro-pneumatic control valve 15 through a pipe 14, an inlet of the control valve 15 is connected to an intake manifold 18 through a vacuum line 17 having a check valve 16, and a vacuum tank 19 is provided in a course of the vacuum line 17. The check valve has the property of passing air flow only toward the intake manifold 18 side. The control valve 15 is connected to an electric control box 21 through a signal line 20, giving instruction of opening in analogue mode corresponding to an intensity of current supplied from the line 20; when the current supplied from the line 20 increases to enlarge the opening of control valve 15, negative pressure in the vacuum chamber increases to enlarge a projection of the rod 10 in the direction of the arrow B and the release lever 5 turns in the direction of the arrow A to decrease the clutch displacement (thrusting amount). Accordingly, the clutch 2 is engaged by halves when the opening of the control valve 15 is small, and the clutch 2 is completely disengaged when the control valve 15 is fully opened. Every kind of input signal is supplied to the electronic control box 21 in order to feed a prescribed current in the line 20 corresponding to every driving condition. 22 is a primary ignition coil from which a pulse (engine rotational speed signal $\omega_E$) corresponding to the engine rotational speed is supplied through a line 23. 24 is a clutch position detecting potentiometer, which practically consists of a displacement-voltage transducer actuated by the rod 10, from which a clutch displacement signal Y is supplied to the control box 21 through a line 25. 26 is a clutch intermediate switch, which practically consists of a proximity switch actuated by a magnet provided on the rod 10 when the clutch 2 gets to the half-engaging condition, from which a clutch intermediate position signal CS is supplied to the control box 21.

28 is a pulse-generator for detecting a vehicle speed from which a signal $\omega_V$ corresponding to the actual vehicle speed is supplied to the control box 21 through a line 29.

30 is an accelerator pedal switch (on-off switch) from which an on-off signal U, informing whether an accelerator pedal 31 is stepped or not, is supplied to the control box 21 through a line 32. 33 is a grip switch (shift lever switch) provided on a shift lever 34, from which an on-off signal S is supplied to the control box 21 through a line 35, the signal S indicating that the grip switch 33 is gripped for a changing operation or that the grip switch 33 is released after the changing operation. A servo-amplifier 36 and a sequence control amplifier 37 are incorporated in the control box 21.

Figure 2:
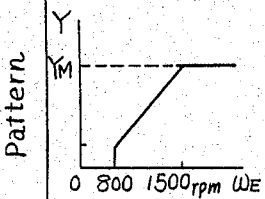
FIG. 2 is a descriptional diagram showing the contents of control.
Figure 2:
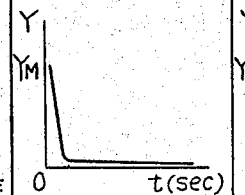
Figure 2:
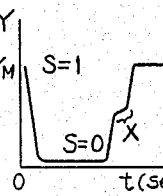
Figure 2:
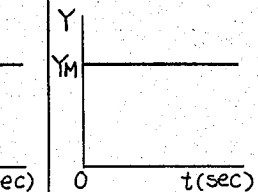

In order to control the clutch, four patterns as shown in FIG. 2, for example, are prepared corresponding to the vehicle speed $\omega_V$, stepped conditions (U) of the accelerator pedal, and gripped conditions (S) of the grip switch 33.

$\omega_{VS}$ written in the column of $\omega_V$ (vehicle speed) in FIG. 2 is a reference vehicle speed (for ex. 15 km/h) previously set in the control box, the reference vehicle speed $\omega_{VS}$ being variable within a range, for example, of 10–25 km/h. Therefore, the column of left half in FIG. 2 corresponds to a vehicle speed smaller than the reference vehicle speed $\omega_{VS}$ such as in starting or in engine braking, and the right half corresponds to a vehicle speed larger than the reference vehicle speed such as in changing speed or in normal driving. In the column of U (condition of accelerator pedal) in FIG. 2, $U \neq 0$ corresponds to an accelerator pedal stepped (such as starting) condition and U=0 corresponds to an accelerator pedal released (such as engine braking) condition, S=1 corresponds to a shift lever switch pushed (ON) condition and S=0 corresponds to a shift lever switch released (OFF) condition.

Contents of control and clutch displacement patterns in every driving condition are as shown in the lower half in FIG. 2. When the vehicle speed $\omega_V$ is smaller than the reference vehicle speed $\omega_{VS}$ such as in starting ($U \neq 0$), follow-up control of the clutch displacement Y is done through the engine rotational speed $\int_E$: the clutch is disengaged at the engine idling speed of 800 rpm and gradually engaged as the engine speed increases therefrom, as seen in the graphic chart in the column of pattern. $Y_M$ is the displacement of clutch when it is engaged. When the accelerator pedal is released at a vehicle speed smaller than the reference vehicle speed, the clutch moves immediately to the position Y=0 (disengagement).

When the shift lever switch is gripped (S=1) to perform the changing operation and released (S=0) at a vehicle speed $\int_V > \omega_{VS}$, the clutch is disengaged quickly and engaged with a cushion range X provided at about a displacement of $Y_M/2$. Namely, an output current in the control box 21 is so changed, by means of a signal from the clutch intermediate switch 26, that an engaging speed of the clutch is once slowed down at a half-engaging condition of the clutch. The clutch is always engaged ($Y = Y_M$) when the shift lever is not operated (S=0; normal driving). As described above, the output current in the control box 21 is so controlled by an electronic circuit that the clutch displacement patterns of FIG. 2 can be obtained corresponding to every driving condition in FIG. 2. Consequently, the clutch engagement at the starting ($\omega_V > \omega_{VS}$, $U \neq 0$) is servo controlled, and the other engagements of clutch are controlled by the cushioned engaging pattern in order to minimize a shock in the engagement. When the condition of the shifting lever switch 33 turned on (S=1) and the stopping motion of the vehicle are required ($\omega_V < \omega_{VS}$, U=0), the clutch is kept at the disengaged condition. A control method is adopted in this invention as described above, in which the clutch thrusting amount is controlled conforming to the engine rotational speed, in order to carry out the starting operation of vehicle smoothly. This servo-control is executed in the following ways. When a clutch desired position ($Y_0$) corresponding to the engine rotational speed ($\omega_E$) is instructed, the control valve is opened in proportion to an error signal between the above and the clutch position (Y), and the vacuum chamber 12 of the servo-cylinder 9 is decompressed to actuate the diaphragm 11 and the rod. The release lever 5 actuates interlocking with the movement of the rod 10 to stop the clutch 2 at a position where $Y - Y_0 = 0$ is achieved, thus the servo-control being completed.

Figure 3:
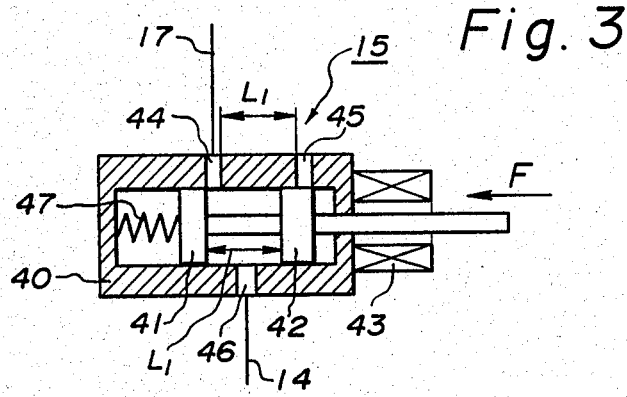
FIG. 3 is a vertical sectional view of the control valve shown in FIG. 1.

A mechanism of the control valve 15 is illustrated in FIG. 3, in which 40 is a cylinder, 41 & 42 are spools of one-piece, 43 is an electromagnet, 44 is a port connected to the vacuum line 17, 45 is a port led to atmosphere, 46 is a port connected to the servo-cylinder, 47 is a compression coil spring, and a distance $L_1$ between the spools 41 and 42 is equal to a distance $L_1$ between the ports 44 and 45.

FIG. 3 shows a condition where the maximum electric current is fed in the electromagnet 43. In this condition, the spools 41 & 42 move toward left against a spring force of the spring 47 by an electromagnetic force in the direction of the arrow F, and the servo-cylinder is supplied with vacuum from the port 46 because the port 45 led to atmosphere is closed and the port 44 connected to the vacuum line is opened. When the electric current is decreased, the spool 42 moves toward right by the spring force of the spring 47, an opening of the vacuum port 44 decreases, the ports 44 and 45 are closed simultaneously by means of the spools 41 and 42, then the port 45 begins to be opened. Pulsating current for overcoming static friction of the spools 41 & 42 may also be applied on the current fed to the electromagnet 43.

Figure 4:
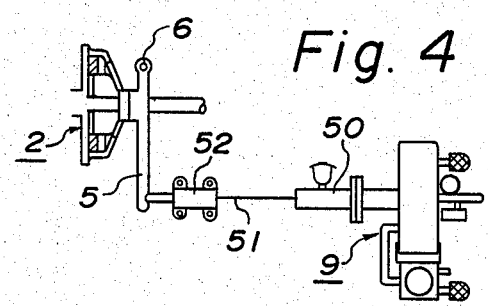
FIG. 4 is a diagramatic side view for the purpose of showing another embodiment.

FIG. 4 shows another embodiment; in which a clutch master cylinder 50, a hydraulic line 51, and a clutch slave cylinder 52 are arranged in between the servo-cylinder 9 and the release lever 5. According to this mechanism, a degree of freedom of a place for equipping the servo-cylinder 9 can be increased.

Further, when embodying this invention, compressed air may also be utilized in place of the vacuum in order to actuate the servo-cylinder 9. Function of the intermediate switch 26 may be shifted to the potentiometer 24.

Since the servo-cylinder 9 actuated by compressed air or vacuum pressure (air pressure) is adopted in this invention as described above, a conventional vehicle can be converted into a vehicle equipped with a semi-automatic transmission without working any great rebuilding therein. It becomes possible to securely avoid such a trouble that servoing behavier changes due to a temperature change and to stabilize the clutch performance by adopting the hydraulic pressure in the servo mechanism. Further, the proportional electro-pneumatic control valve 15 is adopted, which controls the opening corresponding to the intensity of the current; so that the fine and delicate control becomes possible by using only one control valve, driving feeling is improved and the manufacturing cost is decreased.

What is claimed is:

1. A clutch control unit comprising a pneumatic servo-cylinder (9), means for operating a clutch as directed by the servo-cylinder, a pneumatic power supply, a proportional electro-pneumatic control valve (15) for supplying an air quantity corresponding to an intensity of electric current, an electronic control box (21) which controls the above current so as to actuate a clutch in accordance with a given sensed driving patterns previously prescribed on every driving condition, said proportional electro-pneumatic control valve (15) having a cylinder (40), a vacuum port (44) and an atmospheric port (45) provided on a circumferential surface of the cylinder (40) with a distance kept in the axial direction, a port (46) connected to the servo-cylinder (9) provided between the ports (44) and (45), two spools (41) and (42) of one piece fitted in and sliding freely in the cylinder (40), the axial distance between the spools (41) and (42) being made equal to a distance between the vacuum port (44) and the atmospheric port (45), the spools (41) and (42) being elastically pressed from an end of the cylinder (40) and can pushed back in the reverse direction by means of an electromagnet from the other end, and the electromagnet (43) being supplied with a current from the electronic control box (21).

2. A clutch control unit as set forth in claim 1 wherein a pulsating current for overcoming static friction of the spools (41) and (42) is applied on a current which is fed from the electronic control box (21) to the pneumatic control valve (15).

3. A clutch control unit comprising:
(a) a pneumatic servo-cylinder to operate a clutch by means of a linkage of levers connected between said servo-cylinder and said clutch,
(b) a pneumatic power supply,
(c) a single proportional electro-pneumatic control valve to supply an air quantity corresponding to an intensity of electric current so as to actuate a clutch in accordance with a given sensed driving condition said valve having a cylinder, a vacuum port and an atmospheric port on the circumferential surface of said cylinder at axially spaced points, another port disposed between the vacuum port and the atmospheric port and connected to said servo-cylinder, two spools mounted for free sliding movement in said cylinder, the axial distance between the spools being equal to the axial spacing of said vacuum port and said atmospheric port, a spring to elastically force said spools from one end of said cylinder, and an electromagnet connected to said electronic control box to push said spools in a reverse direction when supplied with a current from said control box.

* * * * *